(12) United States Patent
Nishio

(10) Patent No.: US 7,744,715 B2
(45) Date of Patent: Jun. 29, 2010

(54) FLUORORESIN LAMINATED FILM AND METHOD FOR PRODUCING SAME

(75) Inventor: Yoshihiko Nishio, Nagahama (JP)

(73) Assignee: Mitsubishi Plastics, Inc., Tokyo (JP)

(*) Notice: Subject to any disclaimer, the term of this patent is extended or adjusted under 35 U.S.C. 154(b) by 485 days.

(21) Appl. No.: 10/557,372

(22) PCT Filed: May 14, 2004

(86) PCT No.: PCT/JP2004/006534
§ 371 (c)(1),
(2), (4) Date: Nov. 14, 2005

(87) PCT Pub. No.: WO2004/101256
PCT Pub. Date: Nov. 25, 2004

(65) Prior Publication Data
US 2006/0292359 A1  Dec. 28, 2006

(30) Foreign Application Priority Data
May 14, 2003 (JP) .............................. 2003-136342

(51) Int. Cl.
B29C 47/00 (2006.01)
B32B 15/08 (2006.01)
B32B 9/02 (2006.01)
B32B 27/34 (2006.01)
B32B 27/36 (2006.01)
B32B 27/42 (2006.01)
B32B 27/00 (2006.01)

(52) U.S. Cl. .................. 156/244.11; 428/458; 428/459; 428/460; 428/461; 428/462

(58) Field of Classification Search .............. 156/244.1; 428/458, 459, 460, 461, 462
See application file for complete search history.

(56) References Cited

U.S. PATENT DOCUMENTS

| | | | | |
|---|---|---|---|---|
| 4,487,882 A | * | 12/1984 | Ueta et al. | 524/505 |
| 4,839,234 A | * | 6/1989 | Kakugo et al. | 428/349 |
| 4,883,717 A | * | 11/1989 | Kitamura et al. | 428/458 |
| 4,894,419 A | * | 1/1990 | Mizuno et al. | 525/189 |
| 5,314,987 A | * | 5/1994 | Kim et al. | 528/289 |
| 5,527,858 A | * | 6/1996 | Blong et al. | 525/187 |
| 6,042,928 A | | 3/2000 | Suzuki et al. | |

(Continued)

FOREIGN PATENT DOCUMENTS

EP  1226933 A1 *  7/2002

(Continued)

OTHER PUBLICATIONS

Co-pending U.S. Appl. No. 10/931,494, filed Sep. 1, 2004.

(Continued)

*Primary Examiner*—Philip C Tucker
*Assistant Examiner*—Michael N Orlando
(74) *Attorney, Agent, or Firm*—Oliff & Berridge, PLC

(57) ABSTRACT

A method for producing a fluororesin-laminated film comprising the steps of
 co-extruding a fluororesin layer (1) and a resin layer (2) which can be peeled off from the fluororesin layer (1), and
 extrusion-laminating the co-extruded layers on at least one side of a drawn polyethylene terephthalate film while the co-extruded fluororesin layer (1) facing to the drawn polyethylene terephthalate.

12 Claims, 1 Drawing Sheet

U.S. PATENT DOCUMENTS

| | | |
|---|---|---|
| 6,790,510 B1 | 9/2004 | Nishio et al. |
| 6,913,812 B2 | 7/2005 | Nishio et al. |
| 2002/0043330 A1* | 4/2002 | Stripe .................. 156/244.13 |
| 2005/0031881 A1 | 2/2005 | Nishio |

FOREIGN PATENT DOCUMENTS

JP  04290746 A  * 10/1992

OTHER PUBLICATIONS

Patent Abstracts of Japan for JP11-268204 published Oct. 5, 1999.
Patent Abstracts of Japan for JP2002-67241 published Mar. 5, 2002.
Patent Abstracts of Japan for JP7-219134 published Aug. 18, 1995.
Patent Abstracts of Japan for JP2003-246035 published Sep. 2, 2003.
Patent Abstracts of Japan for JP2004-255805 published Sep. 16, 2004.
International Search Report for PCT/JP2004/006534 mailed Aug. 31, 2004.

* cited by examiner

FLUORORESIN LAMINATED FILM AND METHOD FOR PRODUCING SAME

CROSS-REFERENCE TO PRIOR APPLICATION

This is a U.S. National Phase application under 35 U.S.C. §371 of International Patent Application No. PCT/JP2004/006534 filed May 14, 2004, and claims the benefit of Japanese Patent Application No. 2003-136342 filed May 14, 2003, both of which are incorporated by reference herein. The International Application was published in Japanese on Nov. 25, 2004 as WO 2004/101256 A1 under PCT Article 21(2).

FIELD OF THE INVENTION

The present invention relates to a fluororesin-laminated film and a method for producing the same, specifically to a method of extrusion-laminating a fluororesin on to a polyethylene terephthalate film.

DESCRIPTION OF THE PRIOR ART

A fluororesin-laminated film is generally prepared by dry-lamination. However, in the dry-lamination, foreign bodies tend to be entrapped between films to be laminated. Such foreign bodies and vacancies surrounding the bodies damage appearance of the laminated film. Further, in the dry-lamination, surfaces of films to be laminated should be treated in advance by corona discharge and so on, which treatment is laborsome and requires costs.

To avoid the aforesaid problems associated with the dry-lamination, the present inventor found to prepare a fluororesin-laminated film by extrusion-lamination using a tetrafluoroethylene-hexafluoropropylene-vinylidene fluoride terpolymer (THV) (Japanese Patent Applications No. 2002-051910 and No. 2003-51017.)

The extrusion-lamination method of preparing a three-layer fluororesin film is explained with reference to FIG. 1. A fluororesin layer (1) and a resin layer (2) are co-extruded through a T-die at a temperature of 315° C., for instance. The co-extruded layer is pressure-bonded to a drawn polyethylene terephthalate (PET) film 3 between a nip roll 5 and a chill roll 6 with the fluororesin layer (1) facing to the polyethylene terephthalate (PET) film 3. The obtained laminated film (4) is rolled up.

By using the above method, a fluororesin-laminated film without entrapped foreign bodies can be obtained. However, a fluororesin layer (1) having a thickness of 10 μm or smaller cannot be laminated stably.

SUMMARY OF THE INVENTION

An object of the present invention is to provide an extrusion-lamination method which enables one to stably laminate a thin fluororesin layer.

The present invention is a method for producing a fluororesin-laminated film comprising the steps of co-extruding a fluororesin layer (1) and a resin layer (2) which can be peeled off from the fluororesin layer (1), and extrusion-laminating the co-extruded layers on at least one side of a drawn polyethylene terephthalate film while the co-extruded fluororesin layer (1) facing to the drawn polyethylene terephthalate.

In the above method, a surface of the fluororesin layer (1) facing the resin layer (2) can be matted or delustered.

In the above method, a fluororesin layer (3) may be also co-extruded sandwiched between the resin layer (2) and the fluororesin layer (1) in said first step, which fluororesin layer (3) comprises a fluororesin different from the fluororesin constituting the layer (1) and can be peeled from the resin layer (2).

In the above method, the fluororesin layer (1) preferably comprises a tetrafluoroethylene-hexafluoropropylene-vinylidene fluoride terpolymer (THV), the resin layer (2) preferably comprises polyethylene, and the fluororesin layer (3) comprises a resin selected from the group consisting of tetrafluoroethylene-ethylene copolymers, tetrafluoroethylene-hexafluoropropylene copolymers and a poly(vinylidene fluoride).

Preferably, the filler is at least one selected from the group consisting of glass fiber, mica and calcium carbonate. The filler preferably has a particle size of from 1 μm to 1000 μm and is contained in an amount of from 5 wt % to 30 wt % based on a total weight of the resin layer (2).

Another aspect of the present invention is a laminated film comprising a drawn polyethylene terephthalate film and a fluororesin film laminated on at least one side of the drawn polyethylene terephthalate film, characterized in that a difference between a maximum thickness and a minimum thickness (R) along a direction perpendicular to a machine direction is 2 μm/75 cm or smaller.

EFFECTS OF THE INVENTION

By using the above-mentions method of the present invention, a thin fluororesin layer (1) is stably extruded because it is co-extruded with the resin layer (2). The resin layer (2) prevents a surface temperature of the fluororesin layer (1) from dropping, leading to a good adhesion of the fluororesin layer (1) to a polyethylene terephthalate film. The present laminated film has a high uniformity in thickness and is suitable for uses where thickness uniformity is required.

DESCRIPTION OF THE PREFERRED EMBODIMENTS

Figure 1:
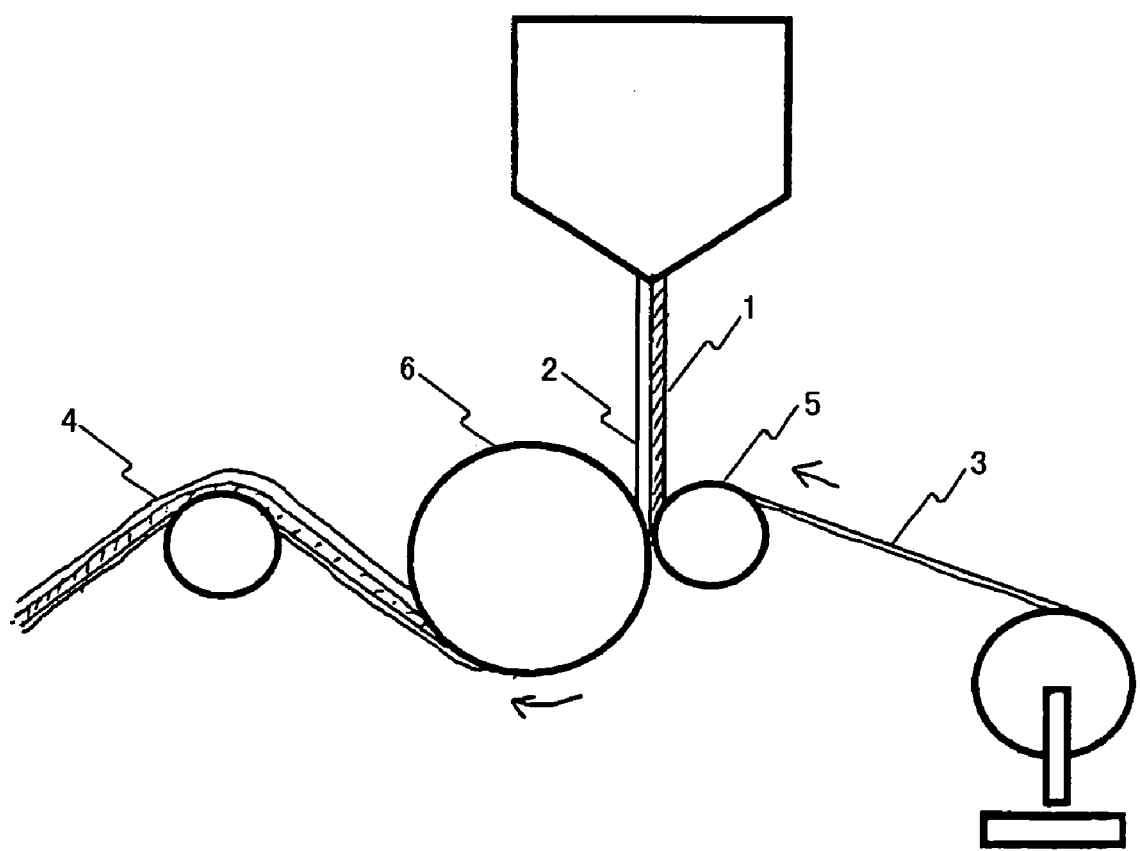
FIG. 1 is a flow chart of the present extrusion-lamination method.

As a fluororesin constituting the fluororesin layer (1), a tetrafluoroethylene-hexafluoropropylene-vinylidene fluoride terpolymer (THV), a poly(vinylidene fluoride), or a derivative thereof such as modified resins having a carboxyl group at an end of a polymer chain is used. Preferably, THV is used.

A crystallization temperature of each of the aforesaid fluororesins varies according to a copolymerization ratio and a degree of modification, but is in the range of from about 90° C. to about 180° C. A crystallization temperature of THV varies according to a ratio of the three polymers, but is in the range of from about 90 to about 180° C. and the one having a crystallization temperature of from about 95° C. to about 140° C. is preferably used.

The present invention is characterized in that the fluororesin layer (1) is laminated immediately after co-extruded with the resin layer (2) which is peelable from the fluororesin. It is considered, without intending to limit the present invention, that the resin layer (2) functions as a heat retaining layer to keep a surface temperature of the fluororesin layer higher than its crystallization temperature, resulting in a strong adhesion. The resin layer (2) also functions as a support layer in the co-extrusion, so that a fluororesin layer so thin as 2 μm to 5 μm can be extruded stably.

As the resin layer (2), any resin can be used as far as it can be co-extruded with the fluororesin layer and is peelable. The term, "peelable", as used herein means that a layer can be peeled off easily by hand. Preferably, the resin which does not contain fluorine is used from the economical viewpoint. Examples of the resin include various kinds of polyethylene, polypropylene, polyesters poly(vinyl chloride), triacetylcellulose, regenerated cellulose, polyamide, polycarbonate, aromatic polyamide, polyimide, polyetherimide, polyphenylenesulphide, polysulphone, and polyethersulphone, among which polyethylene is preferred because of its low price.

Between the resin layer (2) and the fluororesin layer (1), a layer (3) can also be co-extruded which layer comprises a fluororesin different from the fluororesin constituting the layer (1). The different fluororesin include a fluororesin composed of the same components but in different ratios. Examples of the different fluororesin include poly(tetrafluoroethylene) (PTFE), tetrafluoroethylene-perfluorovinylether copolymer (PFA), tetrafluoroethylene-ethylene copolymer (ETFE), tetrafluoroethylene-hexafluoropropylene copolymer (FEP), polychlorotrifluoroethylene (CTFE), poly(vinylidene fluoride) (PVdF), and THV having a different compositional ratios from THV contained in the fluororesin layer (1), among which ETFE, FEP and PVdF are preferably used.

By incorporating a filler in the resin layer (2) such as glass fiber, mica, and calcium carbonate, the heat retaining effect of the resin layer (2) can be further improved.

By selecting a size and a content of the filler, a surface of the resin layer (1) facing the resin layer (2) can be rugged. That is, a shape having dents and bumps are formed on the surface of the resin layer (2) by the filler, which shape is transferred to the fluororesin (1) or the resin layer (3), if there is the resin layer (3). Thus, the surface of the fluororesin layer (1) or resin layer (3) are matted or delustered.

Such a matted surface is desired to facilitate entrapped air to escape when the fluororesin-laminated film is used as a release film in press-molding process. The matted surface is also desired when the fluororesin-laminated film is used as a carrier film to form a coating film having a matted surface. However, it is difficult to mat a preformed fluororesin by heating due to a high melting point of the fluororesin. By using the present method, one can easily mat a film simultaneously with extruding a film. To attain matting, the filler has a particle size of from 5 µm to 1000 µm, preferably from 20 µm to 100 µm and is contained in an amount of from 5 to 30 wt %, preferably from 10 to 25 wt %, based on a total weight of the resin layer (2). If a filler having a smaller size than aforesaid lower limit or a filler in an amount less than the aforesaid lower limit is used, only an improved heat-retaining effect of the resin layer (2) is attained without matting.

The resin layer (2) is peeled off just before using the laminated film. However, it may be peeled off at any time between just after production of the laminated film to just before using the film. By leaving the resin layer (2) unpeeled, the resin layer (2) can function as a protective film for the fluororesin layer (1) or (3).

In the present invention, a thickness of the fluororesin layer (1) can be set according to a crystallization temperature of the fluororesin or an intended use of a laminated film, but typically ranges from 2 to 10 µm, preferably from 2 to 5 µm. If the thickness is smaller than the aforesaid lower limit, a laminated film may have defects devoid of the fluororesin due to a wide variation in thickness of a thin film. If the thickness exceeds the aforesaid upper limit, improvement in performance according to increase in production costs cannot be obtained.

A thickness of the fluororesin layer (2) can be set according to a crystallization temperature and a thickness of the fluororesin layer (1), and an extruder die temperature. When the fluororesin is THV and a thickness of the THV layer ranges from 2 µm to 10 µm, the thickness of the fluororesin layer (2) typically ranges from 5 µm to 500 µm, preferably from 8 to 20 µm. If the thickness is below the aforesaid lower limit, sufficient effect to retain temperature of the fluororesin layer may not be attained. A thickness exceeding the aforesaid upper limit may cause a prolonged cooling time after the lamination or toughening of the peeling from the fluororesin.

A thickness of the fluororesin layer (3) can be selected according to intended use of the laminated film and, for a release film, the thickness may range from 2 µm to 10 µm, preferably from 2 µm to 5 µm.

As the PET film in the present invention, various kinds of any known drawn PET film can be used. The fluororesin layer may be laminated one side or the both sides of the PET film. The PET film has a thickness of from 5 to 300 µm, preferably from 25 to 100 µm. If the thickness is smaller than the aforesaid lower limit, handling property of the obtained laminated film is worse. If it is larger than the aforesaid upper limit, thickness precision of the polyester film is worse and, in addition, manufacturing costs and an amount of waste may increase.

On a surface of the PET film, an adhesive such as an acryl-modified adhesive, an isocyanates adhesive, a polyethyleneimine adhesives a polyurethane adhesive, or a silane coupling agent is applied in advance. An adhesive PET that is coated with an adhesive described in Japanese Patent Application Laid-Open No. 2000-229394, for example, is preferred because one can save the coating process.

The present invention relates also to a fluororesin-laminated film having a high uniformity in thickness. The film is characterized in that a thickness difference (R) between a maximum thickness and a minimum thickness is 2 µm/75 cm or smaller, which thickness was measured continuously from a point on a surface of the film over 75 cm along a direction perpendicular to extruded direction, i.e., a machine direction, with a continuous thickness meter using a tip of 5 mm in diameter.

A thin fluororesin film generally has a poor thickness precision, particularly a thickness precision in a direction perpendicular to extruded direction, i.e., the machine direction. To improve the thickness precision of the thin fluororesin film, a method to laminate a thin fluororesin film on a polyester film having a good thickness precision is known as disclosed in Japanese Patent Application Laid-Open No. 2002-67241.

However, in the method, the laminated film is made by dry-laminating a preformed polyester film with a fluororesin film and dusts and bubbles are tend to be entrapped between the films, which makes it difficult to attain R smaller 3 µm.

Surprisingly, an extrusion-lamination of the present invention was found to be able to make R 2 µm or smaller. Reasons for this is considered that fine tuning of a thickness is possible during the extrusion and, even if there is a foreign body on films, extruded molten resin flows to fill a vacancy around the foreign body without leaving air entrapped around the foreign body to attain a flat surface relatively easily. The fluororesin-laminated film having such a uniform thickness of the present invention is suitable for uses where uniform thickness is required, for example, a carrier film for preparing a coating film. The method for measuring R will be described in detail in Examples.

The drawn polyester film and the fluororesin film in the fluororesin-laminated film are as described above concerning the present method. A film of a fluororesin different from the fluororesin layer (1) may be laminated on the fluororesin layer (1) which different fluororesin film may be the same as the fluororesin layer (3) described above regarding the present method.

Examples

The present invention will be explained further with reference to the following examples.

(1) Films and fillers used are as shown below. In parentheses, the abbreviations shown in Table 1 are described.

Drawn polyethylene terephthalate film (PET-1): ex Mitsubishi Polyester Film Corp., Adhesive drawn polyethylene terephthalate film (PET-1): UV4 (trade name), ex Unitika Ltd., Tetrafluoroethylene-hexafluoropropylene-vinylidene fluoride terpolymer (THV) resin: THV220, ex Dyneon Co., having a crystallization temperature of 98° C., Tetrafluoroethylene-ethylene copolymer (ETFE): Tefzel 290 (trade name), ex Mitsui Dupont Fluorochemical Co., Poly(vinylidene fluoride): Kynar 720 (trade name), ex Elf Atochem S.A., Tetrafluoroethylene-hexafluoropropylene copolymer (FEP): Neoflon FEP-100 (trade name), ex Daikin Industries, Ltd., Low density polyethylene (PE) having a density of 0.95 and MFR of 3 g/10 min, ex Nippon Polychem Corp., Spherical mica having an average particle size of 50 μm, ex Kuraray Co., Ltd.

(2) Preparation of Films

Films each having a structure as shown in Table 1 were prepared. In Examples 4 and 5, a polyethylene resin containing 10 wt % of filler was used. In Example 6, the adhesive drawn polyethylene terephthalate film was used. A laminated film was prepared by co-extruding a resin layer (1) and a resin layer (2), or resin layers (2) and (3) in Examples 4 and 5, through a T-die at a temperature of 315° C. The co-extruded layers, with the resin layer (1) facing to a PET, were laminated on a surface of the PET film coated with a acryl-modified adhesive in advance, or a PET film without such a coating in Example 6, while monitoring a thickness of the laminated film with an X-ray continuous-mode thickness meter, WEB-FLEX2, ex Yokokawa Electric Co. The films in Comparative Examples were prepared in the same manner as described above except that the PE resin layer (2) was not co-extruded. The film in Comparative Example 1 was prepared by dry-lamination. The films obtained were evaluated according to the following methods. The results are as shown in Table 1.

(3) Methods for Evaluation (i) Stability of Lamination:

A laminated film which was prepared by a stable lamination was rated as "A", and the one which could not be prepared by a stable lamination to be wrinkled or the like was rated as "B."

(ii) Adhesion Strength

An adhesion strength between a fluororesin layer (1) and a PET film was measured according to the 180-degree peeling test specified in the Japanese Industrial Standards Z-0237 at a pulling rate of 5 mm/min. A film having an adhesion strength of 4 N/cm or larger was rated as "A" and the one having an adhesion strength less than 4 N/cm was rated as "B."

(iii) Matted State

After peeling a resin layer (2), a surface of the resin layer (3) was visually observed. A film uniformly matted or delustered was rated as "A", otherwise rated as "B."

(iv) Measurement of Thickness Difference R(μm)

A thickness of a film was measured continuously over 75 cm along a direction perpendicular to the machine direction across the full width of the film with a FILM THICKNESS TESTER, ex Anritsu Co., using a tip of 5 mm in diameter. Differences between the maximum and the minimum thickness were calculated and averaged. Films were rated according to the following criteria.

A: R of 2 μm or smaller,

B: R larger than 2 μm, and

C: R larger than 5 μm.

Table 1

TABLE 1

|  | Film structure (Film thickness (μm)) | Stability of Lamination | Adhesion strength | Matted state | R(μm) |
|---|---|---|---|---|---|
| Example 1 | PE/THV/PET-1 (10/3/50) | A | A | — | A |
| Example 2 | PE/ETFE/THV/PET-1 (10/3/3/50) | A | A | — | A |
| Example 3 | PE/PVDF/PET-1 (10/3/50) | A | A | — | A |
| Example 4 | PE(10% mica)/ETFE/THV/PET-1 (10/3/3/50) | A | A | A | A |
| Example 5 | PE(10% mica)/FEP/THV/PET-1 (10/3/3/50) | A | A | A | A |
| Example 6 | PE/ETFE/THV/PET-2 (10/3/3/50) | A | A | — | A |
| Referential Example 1 | THV/PET-1 (3/50) | B | B | — | B |
| Referential Example 2 | PVDF/PET-1 (3/50) | B | B | — | B |
| Referential Example 3 | ETFE/THV/PET-1 (3/3/50) | B | B | — | B |
| Comparative Example 1 | ETFE/PET-1 (3/50) | — | A | — | C |

As can be seen from the above Table, a thin fluororesin film can be laminated with strong adhesion strength and easily matted by using the present extrusion-lamination method. In Referential Example, it was difficult to stably extrude the fluororesin and the obtained film had a weaker adhesion strength and a larger thickness variation. The film of Comparative Example 1 made by dry-lamination had bumps due to entrapped foreign bodies or air bubbles to have a very wide variation in thickness.

INDUSTRIAL APPLICABILITY

By using the present method, a film laminated with a thin fluororesin layer can be stably produced by extrusion-lamination. A surface of the fluororesin layer can be matted easily. The present film has a superior thickness precision to be suitable as a carrier film for producing a coating film.

EXPLANATION OF NUMERALS IN THE DRAWING

1 Fluororesin layer (1)
2 Resin layer (2)
3 Drawn polyester film
4 Laminated film
5 Nip role
6 Chill role

The invention claimed is:

1. A method for producing a fluororesin-laminated film comprising:
   co-extruding a fluororesin layer having a thickness of from 2 μm to 10 μm that comprises tetrafluoroethylene-hexafluoropropylene-vinylidene fluoride terpolymer (THV) and a resin layer that can be peeled off from the fluororesin layer, and
   extrusion-laminating the co-extruded layers on at least one side of a drawn polyethylene terephthalate film with the co-extruded fluororesin layer facing the drawn polyethylene terephthalate film so that an adhesion strength between the fluororesin layer and the drawn polyethylene terephthalate film, as determined in accordance with a 180-degree peeling test specified in the Japanese Industrial Standards Z-0237 at a pulling rate of 5 mm/min, is 4 N/cm or larger.

2. The method according to claim 1, wherein the resin layer comprises a filler to mat a surface of the fluororesin layer facing the resin layer.

3. The method according to claim 1, wherein a fluororesin layer is also co-extruded between the resin layer and the fluororesin layer in said first step, which fluororesin layer comprises a fluororesin different from the fluororesin constituting the layer and can be peeled from the resin layer.

4. The method according to claim 3, wherein the resin layer comprises a filler to mat a surface of the fluororesin layer facing the resin layer.

5. The method according to claim 1, wherein the resin for the resin layer does not contain fluorine.

6. The method according to claim 5, wherein the resin which does not contain fluorine is polyethylene.

7. The method according to claim 3, wherein the fluororesin layer comprises a resin selected from the group consisting of tetrafluoroethylene-ethylene copolymers, tetrafluoroethylene-hexafluoropropylene copolymers and a poly(vinylidene fluoride).

8. The method according to claim 2, wherein the filler is at least one selected from the group consisting of glass fiber, mica and calcium carbonate.

9. The method according to claim 2, wherein the filler has a particle size of from 1 μm to 1000 μm and is contained in an amount of from 5 wt % to 30 wt % based on a total weight of the resin layer.

10. The method according to claim 5, wherein the resin layer has a thickness of from 8 μm to 20 μm.

11. The method according to claim 4, wherein the filler is at least one selected from the group consisting of glass fiber, mica and calcium carbonate.

12. The method according to claim 4, wherein the filler has a particle size of from 1 μm to 1000 μm and is contained in an amount of from 5 wt % to 30 wt % based on a total weight of the resin layer.

* * * * *